Patented July 19, 1927.

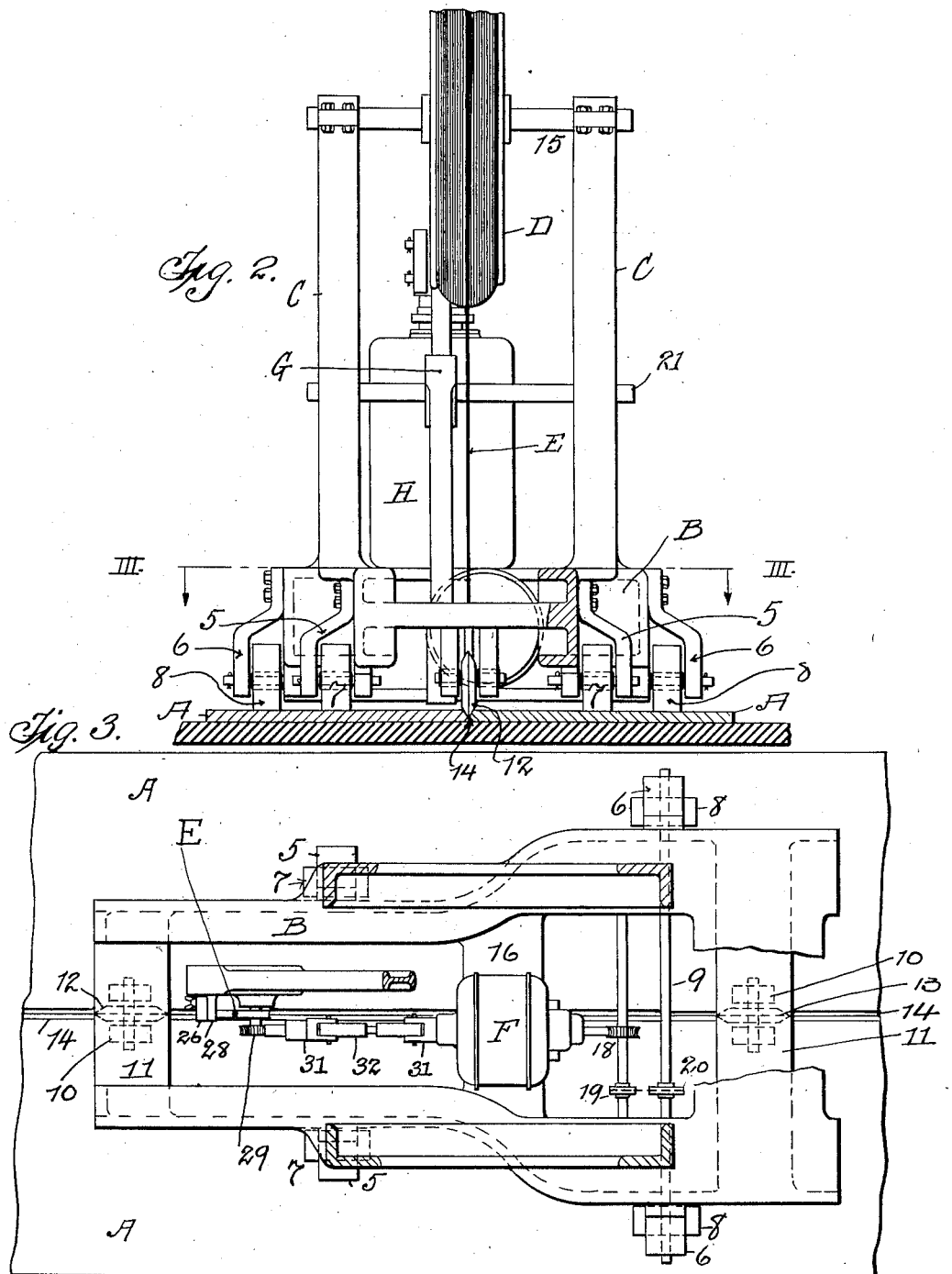

1,636,104

UNITED STATES PATENT OFFICE.

THOMAS E. MURRAY AND HARRY R. WOODROW, OF NEW YORK, N. Y.; SAID WOODROW ASSIGNOR TO SAID MURRAY.

ARC-WELDING MACHINE.

Application filed October 25, 1919. Serial No. 333,332.

The invention is an automatic arc welding machine. The operation of arc welding is determined by three principal features, namely: (1) the striking of the arc; (2) the uniform and continuous feeding of the pencil electrode toward the weld, and (3) the stopping of the arc. All of these in their proper order are automatically accomplished by the present machine.

The mode or organization is as follows:

The objects to be welded—as here shown, two plates to be united edge to edge—are placed upon a suitable bed, over which a carriage supporting the mechanism is caused to travel in the direction of the joint. A fusible electrode—here the end of a wire of fusible metal taken from a freely rotating reel on the carriage—is caused to follow the joint. The welding arc is struck from the end of the wire, which is continuously fed as consumed to the joint. The wire as it is melted enters the joint, while at the same time the metal of the plates at the joint is rendered plastic by the arc, so that said plates and wire progressively become united, until the entire joint is completed.

In another application for Letters Patent Serial No. 305,089, filed by Harry R. Woodrow June 18, 1919, there is set forth and broadly claimed an automatic arc welding machine embodying the principle and many features of the machine herein disclosed. The subject-matter of the said application is, therefore, not herein claimed. The specific construction of the machine illustrated in the said earlier application is such as to adapt it to the welding of a joint between the abutting ends of two rotating cylinders, in which case the mechanism is stationary, while the work moves. In contrast to this, the specific construction of our present machine is such as to adapt it to the welding of stationary plates, or the like, over which the mechanism travels, so that instead of the joint moving in front of the arc pencil, the pencil is carried along the joint.

In the accompanying drawings—

Figure 1:
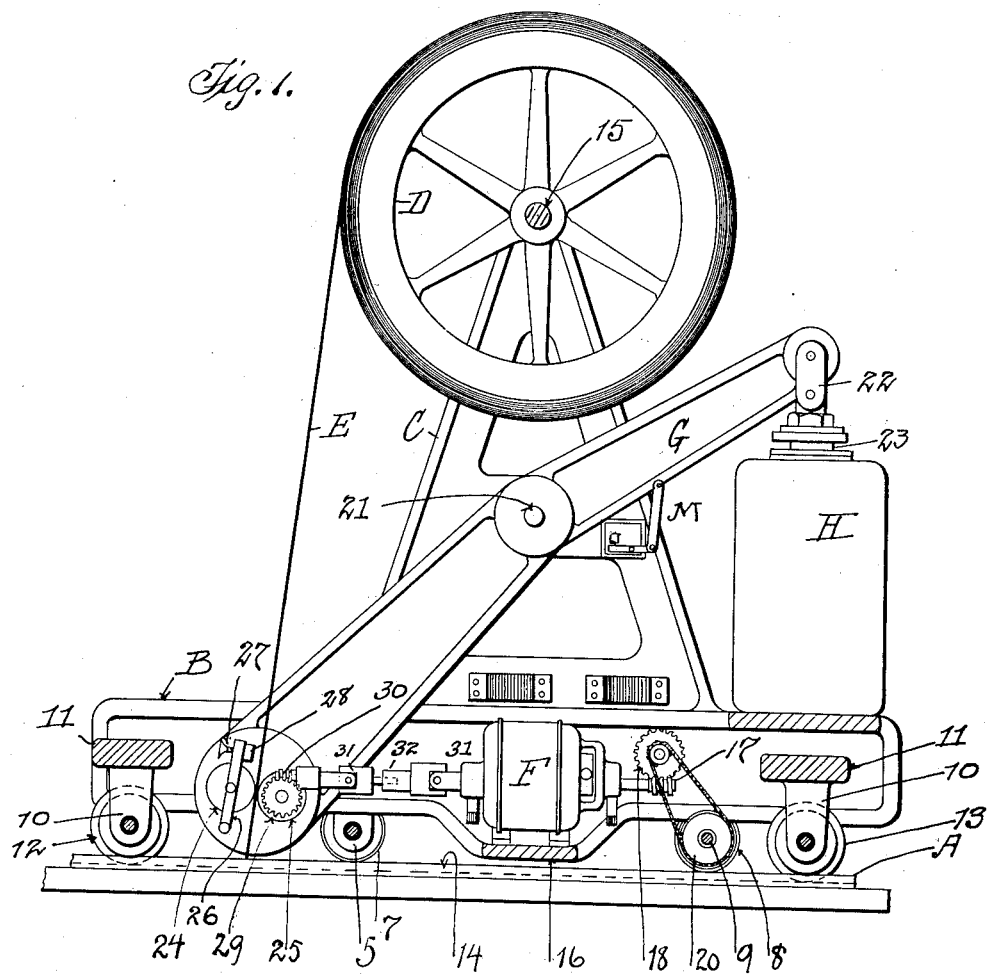
Figure 4:
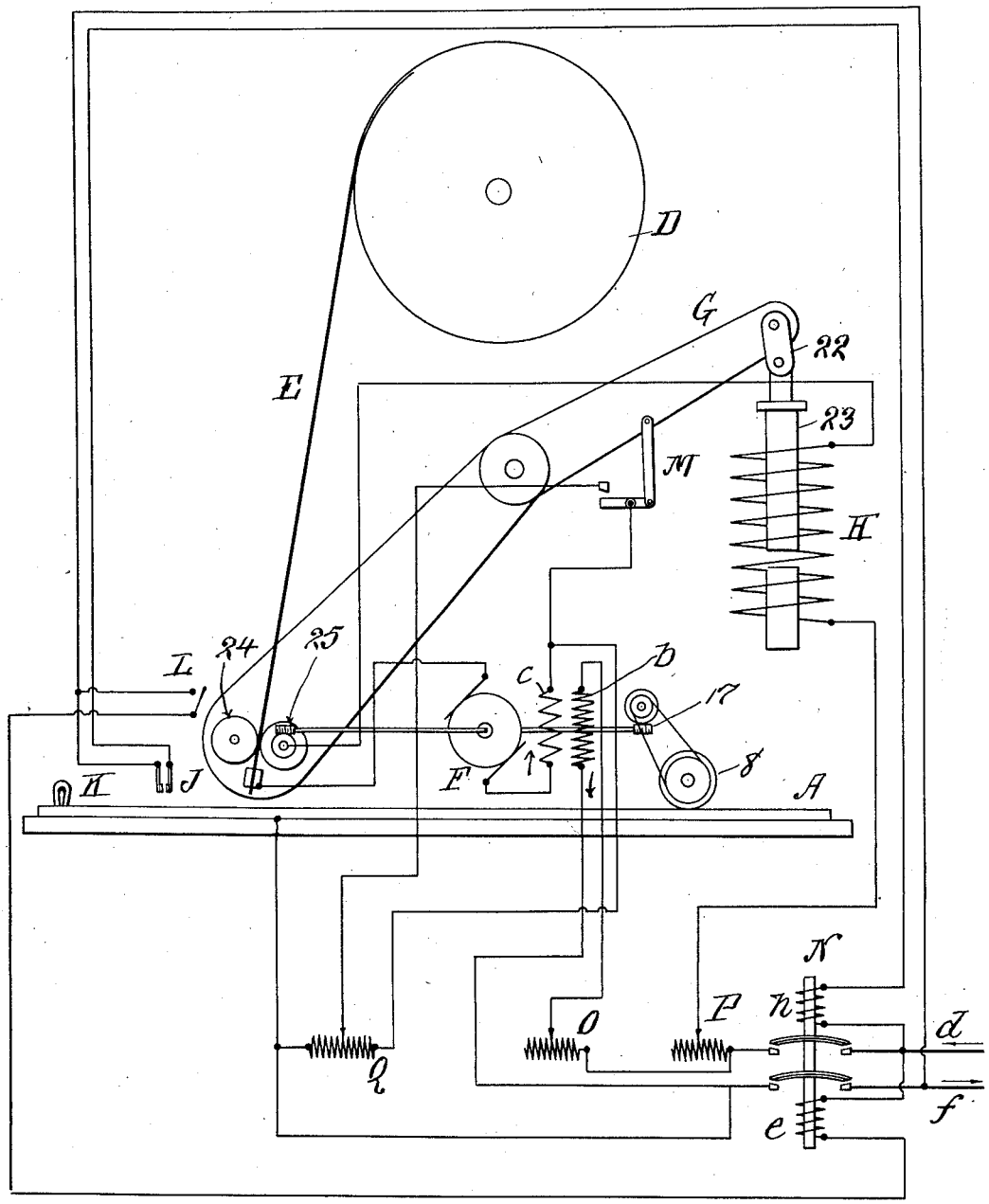
Figure 5:
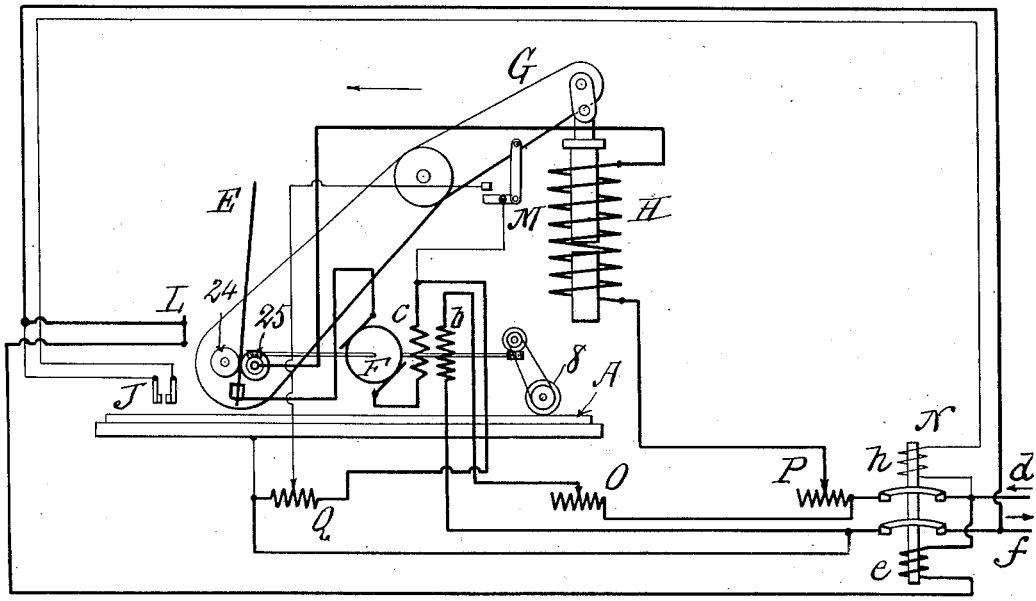

Fig. 1 is an elevation of our electric arc welding machine, parts of the carriage and rod 15 being shown in section. Fig. 2 is a front elevation, a portion of the carriage, the work and the bed being here shown in section. Fig. 3 is a horizontal section on the line III—III of Fig. 2. Fig. 4 is an electrical diagram, showing the circuits and parts of the machine when not in operation. Figs. 5, 6, 7 and 8 are electrical diagrams, showing the circuits established and position of parts during successive stages of the operation of the machine.

Similar letters and numbers of reference indicate like parts.

The work, here two plates A, A of metal to be welded edge to edge, rests upon a bed or table. The machine is supported on the carriage B, on opposite sides of which are brackets 5, 5 and 6, 6, Figs. 2, 3. The carriage supporting trucks 7, 7 are journaled in brackets 5, 5. The carriage supporting trucks 8, 8 are carried by a shaft 9 which extends across the carriage (Fig. 3) and is journaled in the brackets 6, 6. The trucks travel upon the work. Supported in brackets 10 on cross girders 11 of the carriage are the guide rolls 12, 13 having beveled edges which enter the groove 14, Fig. 2, formed by the correspondingly beveled edges of the work at the joint. The guide rolls being at the front and rear of the machine and engaging the seam at the front and rear of the welding point provide a long guiding line so as to hold the machine easily and accurately to the desired direction.

Mounted on the carriage B are standards C in which is journaled the transverse rod 15 which carries the freely rotatable reel D, upon which is wound any desired length of welding wire E. The reel is preferably made removable from the standards for purposes of refilling.

Supported upon a cross girder 16 of carriage B is an electric motor F. On one end of the motor shaft is a worm 17 which engages with a pinion 18 on transverse shaft 19. A chain belt transmits power from pinion 18 to pinion 20 on shaft 9. The carriage supporting trucks 8, 8 are thus driven to cause the carriage to travel over the work.

Extending through the standards C is a shaft 21, on which is pivoted the arm G. To one end of said arm is connected by a link 22 the plunger core 23 of an electromagnet H supported on carriage B. On the side of said arm near the opposite end thereof are two feed rolls 24, 25 which receive between them the wire E from the reel D, the end of said wire extending downward to the welding joint. The feed roll 24 is pivoted on a swinging arm 26, so that said roll may be pressed against the wire E to tightly cause said wire to be tightly grasped between the feed rolls 24 and 25, and drawn from the reel D. The means for pressing roll 24 against the wire and roll 25 is not a part of our present invention, and any suitable device may be used—such, for example, as a clamping screw, indicated at 27, Fig. 1, passing through arm 26 and engaging a lug 28 on arm G.

The feeding of wire E is caused by the rotation of feed roll 25, on the shaft of which is a pinion 29 with which engages a worm 30 on the end of the shaft of motor F opposite to that on which worm 17 is carried. The motor F, therefore, performs the two functions of moving the carriage B, and hence the end of the welding wire E along the joint, and of feeding said welding wire to said joint.

In order to permit of the movement of arm G on its pivot shaft 21, we interpose in the motor shaft two universal joints 31 and an expansion joint 32, whereby said motor shaft is rendered flexible.

The electrical connections.

Referring to the diagram Fig. 4, J is a spring switch normally open, but closed when, by reason of the movement of carriage B on which it is supported, it makes contact with a projection K which is here a permanent magnet in horse-shoe form, adherent to the work and manually applied thereto at a particular moment, as hereinafter explained. L is a manually controlled switch. M is a switch connected by a link to arm G, which closes circuit when the right hand end of said arm is drawn down by electro-magnet H. N is the main supply switch communicating with the source of current (not shown) by leads d, f. O, P, Q are variable resistances. The motor F is of the differential compound wound type, the shunt field b receiving its supply across the potential from supply switch N through the variable resistance O. The series field c is connected in reverse to the shunt field b, as indicated by the arrows.

The operation is as follows, the live circuits being in Figs. 5, 6, 7 and 8 indicated by heavy lines: The switch L is manually closed. The circuits established are then as in Fig. 5. The entering supply current from main lead d passes through the lower coil e of switch N, energizing said coil, which closes said switch N, and so to closed switch L and main lead f. Switch N being closed, the current divides as follows: part proceeds through a portion of variable resistance P, to electro-magnet H, to feed roll 25, to wire E, to the brushes of motor F, to series field c, through all of variable resistance Q, and thence back to switch N and main lead f.

Another part proceeds to a part of variable resistance O, to shunt field b, and so back to switch N and main lead f. These circuits being established and switch N closed, switch L may be opened, and so left.

Figure 6:
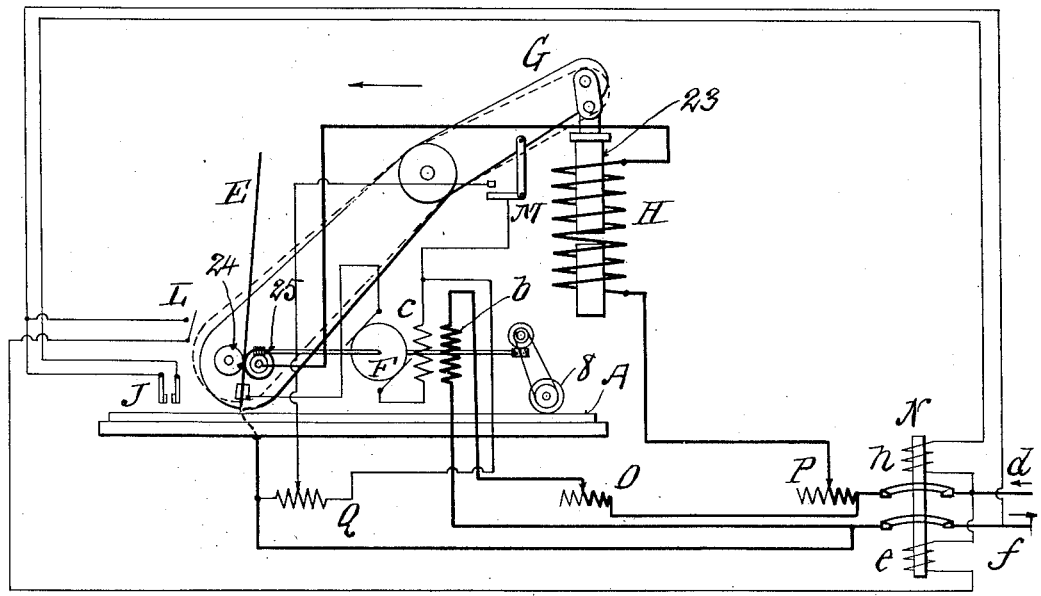

The current through series field c and resistance Q is not sufficient to energize electro-magnet H, but is sufficient to start motor F. As soon as motor F starts, the wire will be gradually fed forward by the feed rolls 24, 25 until its end makes contact with the work, as shown in Fig. 6. At this instant, and for an instant only, a short circuit will be formed through the work and bed, to switch N and lead f.

Because of this short circuiting of resistance Q, field c and the motor, a comparatively heavy current will at once pass to electro-magnet H, which will draw down the right hand end of arm G, as indicated by the dotted lines in Fig. 6. The period of time in which this short circuiting and tilting of the arm G takes place is infinitesimal, so that the motor does not stop, but continues rotating by inertia. As the arm G tilts, it moves the end of the wire E away from the work, and the welding arc is at once struck between said end and the work, as indicated at g in Fig. 7.

Figure 7:
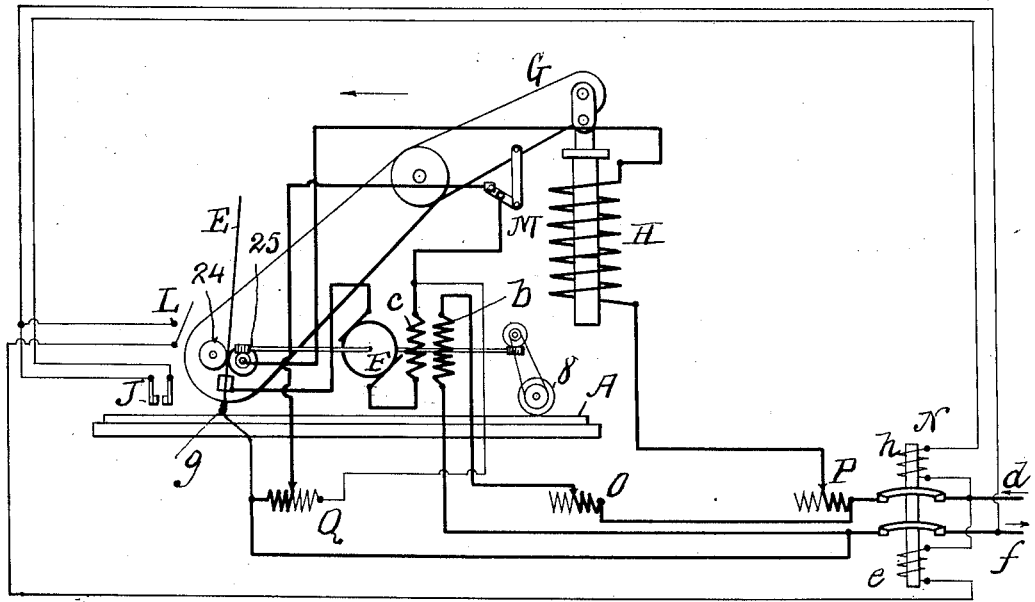

The tilting of arm G also closes switch M. The resulting circuits, as shown in Fig. 7, are then as follows: from main lead d, to switch N, through a portion of variable resistance P, electro-magnet H, feed roll 25, motor F, series field c, switch M, a portion of variable resistance Q, and so to switch N and main lead f.

As the currents in the shunt field and series field of the motor are now in opposite directions, the motor will operate at a speed corresponding to the power differential of the fields, and becomes very sensitive. That is, the slightest change in the struck arc voltage will affect its speed, which in turn will govern the speed of the wire feeding rolls, and also that of travel of the carriage, and hence of movement of the wire E along the joint. Previous to the welding operation, the motor circuit energy consumption through the variable resistances O, P, Q is exactly adjusted to give the proper amount of current to melt the welding wire E, and once set will always maintain the balance for a certain kind of work and welding wire. Consequently after the arc has been struck and the wire feeding and work driving mechanism started, as described, uniform feeding of the welding wire and continuous progress of the weld are accomplished.

Figure 8:
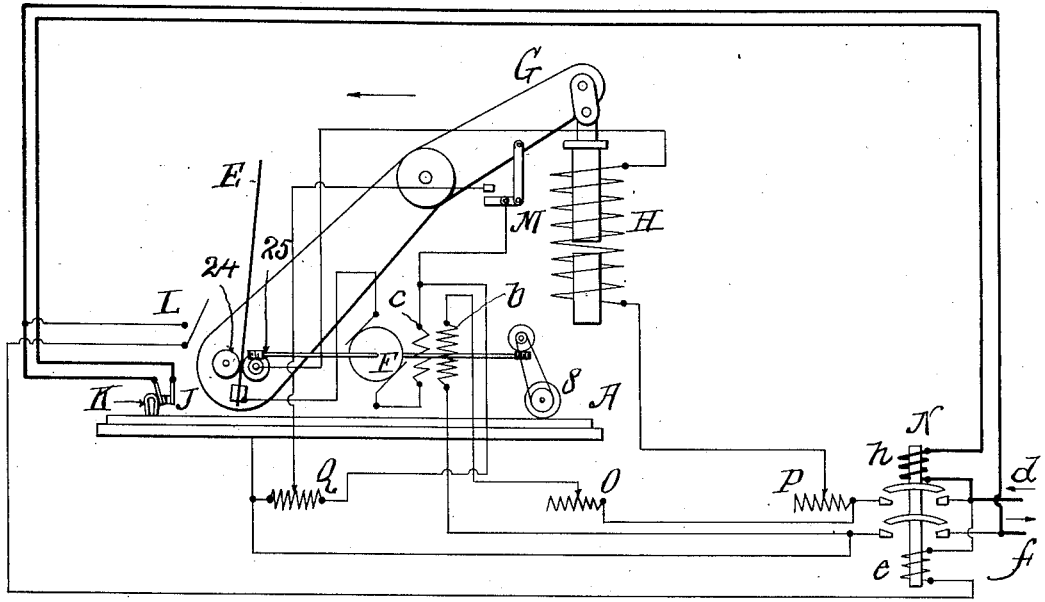

Returning once more to Fig. 7, after the arc is struck and after the weld has begun, the operator applies to the work a small, preferably horse-shoe-shaped permanent magnet K, so that by its own attraction its polar ends will adhere to said work. The position of this magnet is to be such that after the work has completed its travel and the weld is finished, the switch J will meet the magnet and be closed thereby, as shown in Fig. 8. Circuit is thus closed through the upper coil $h$ of switch N, whereby said switch is opened and the whole machine stopped. The completed work is then removed, and the carriage returned to its original position.

We claim:

1. An arc welding machine, comprising a portable carriage, trucks beneath said carriage and supporting the same upon the surface above which said carriage travels therefor, and, disposed on said carriage, a metal wire electrode, means for continuously feeding said wire to the welding joint, and means for simultaneously driving said trucks and said feeding means.

2. An arc welding machine, comprising a portable carriage, a driving electric motor on and for said carriage, a metal wire electrode, means actuated by said motor for feeding said electrode to the welding joint, a movable support for said feeding means, and means automatically operating to move said last-named support to carry the end of the wire away from the work to strike the welding arc; the said motor, electrode, feeding means, feed operating means, movable support and arc striking means being carried upon said carriage.

3. An arc welding machine, as in claim 2, the said automatically operating means comprising an electromagnet, and circuit connections, as set forth; whereby upon the establishment of contact of the end of the fusible electrode with the work, said magnet is energized to move said movable support and electrode to cause said electrode to strike the welding arc.

4. An arc welding machine comprising a portable carriage adapted to bear upon the work, means for supporting a metal wire electrode thereon, means for continuously feeding said wire to the welding joint, means simultaneously driving said carriage and said feeding means, and means for positively guiding the carriage in the direction of the welding joint.

5. An arc welding machine, as in claim 1, further including means for positively guiding the carriage in the direction of the welding joint; the said means consisting of a roller supported below said carriage and adapted to enter the gap between the objects to be welded in advance of the said electrode.

6. An arc welding machine, comprising a carriage, supporting trucks therefor, and, on said carriage, a metal wire electrode, means for continuously feeding said electrode to the work, a movable support for said feeding means, and a driving electric motor on and for said carriage, the shaft of said motor being geared at opposite ends to said feeding means and said trucks.

7. An arc welding machine, comprising a carriage, a support thereon movable toward and from the work, feed rolls on said support, a metal wire electrode engaged by said rolls, a driving electric motor on and for said carriage, a flexible shaft transmitting power from said motor to said feed rolls, and automatically operating means for operating said support to cause said electrode to strike the welding arc.

8. An arc welding machine, comprising a fusible electrode cooperating with the welding joint to strike an arc at said joint, means for progressively moving said electrode along said joint, and means controlled by voltage variations in said arc for controlling the speed of progression of said electrode.

9. An arc welding machine, comprising a fusible electrode cooperating with the welding joint to strike an arc at said joint, mechanism for feeding said electrode, means for progressively moving said electrode along said joint, and means controlled by voltage variations in said arc for controlling both the speed of said feed and the speed of progression of said electrode.

In testimony whereof we have affixed our signatures.

THOMAS E. MURRAY.
HARRY R. WOODROW.